US 6,542,519 B1

(12) United States Patent
Almqvist et al.

(10) Patent No.: US 6,542,519 B1
(45) Date of Patent: Apr. 1, 2003

(54) INTENTIONAL SIDELOBE CREATION

(75) Inventors: Dag Almqvist, Mölndal (SE); Sven Oscar Petersson, Sävedalen (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 09/300,127

(22) Filed: Apr. 27, 1999

(30) Foreign Application Priority Data

Apr. 27, 1998 (SE) .............................................. 9801473

(51) Int. Cl.⁷ .............................. H04J 1/00; H04B 1/02
(52) U.S. Cl. ...................... 370/480; 455/562; 455/103; 455/101
(58) Field of Search ................................ 370/480, 336, 370/337, 347, 345; 455/562, 450; 342/368, 172, 374

(56) References Cited

U.S. PATENT DOCUMENTS

| 5,559,806 | A | | 9/1996 | Kurby et al. | |
|---|---|---|---|---|---|
| 5,561,673 | A | * | 10/1996 | Takai et al. | 714/708 |
| 5,907,816 | A | * | 5/1999 | Newman et al. | 455/562 |
| 5,987,037 | A | * | 11/1999 | Gans | 370/480 |
| 6,072,792 | A | * | 6/2000 | Mazur et al. | 370/345 |
| 6,252,542 | B1 | * | 6/2001 | Sikina et al. | 342/174 |
| 6,301,238 | B1 | * | 10/2001 | Hagerman et al. | 370/336 |
| 6,453,176 | B1 | * | 9/2002 | Lopes et al. | 455/562 |
| 6,463,301 | B1 | * | 10/2002 | Bevan et al. | 455/562 |

FOREIGN PATENT DOCUMENTS

| GB | 2307142 A | 5/1997 |
|---|---|---|
| WO | 94/11956 | 5/1994 |
| WO | 96/29838 | 3/1995 |

* cited by examiner

Primary Examiner—Tracy Legree
Assistant Examiner—Yuwen Pan

(57) ABSTRACT

A beam having the best performance for the present downlink transmits the signal carrying information. In another beam transmitted, in a corresponding manner having the best performance in regard to the next mobile station to be communicated in a next time slot, a signal is created which has a low cross correlation relative to the present signal carrying information. The average power in the direction to the next mobile station to be communicated in the next TDMA time slot will be given by the sum of the average power of the two signals after amplification by the respective antenna pattern. This takes place because the cross correlation between the signals is low due to which fact the summed signal will show a power addition but not a coherent addition. This is feasible as the summed signal is not be decoded by the next mobile station, but used entirely as a measurement of power. To further improve operation, the interleaving beams produced by two offset Butler Matrixes and then applied to a combiner may be used.

22 Claims, 7 Drawing Sheets

INTENTIONAL SIDELOBE CREATION

TECHNICAL FIELD

The present invention relates to an apparatus and a system for generation of an intentional sidelobe in adaptive antenna systems for mobile telephony, particularly for systems utilizing PDC standard.

BACKGROUND

In cellular mobile telephony systems of today the base stations utilize antennas for omnidirectional radiation or sectorized radiation (each sector typically having 120 degrees of coverage). The antenna patterns then will cover the entire cell and no knowledge of the particular position of the mobile stations is normally used. For increasing range and capacity, beam shaping solutions like antenna arrays may be used. The narrow beams of such an array antenna may be utilized to improve the link-budget in both uplink and downlink and to reduce interference in both uplink and downlink. In Time Division Multiple Access systems (TDMA) it is sufficient to transmit signal, for teach user, during a current time slot within a narrow sector in a direction towards the mobile station. This is generally illustrated in FIG. 1.

Users of the system will have channels, a specific time slot on a specific frequency allocated in such a way that mutual interference between different users should be minimized. Consequently, the idea is to avoid spreading power in directions, which the present communication is unable to use, i.e. thereby minimizing interference within the system. The level of interference affects the channel re-use pattern in the cellular system. Without changing the cellular planning the interference level will according to such a method be decreased by utilizing beam shaping with narrow beams based on knowledge of positions of the respective mobile stations communicating with a certain base station. This lowering of interference may be used for either accomplishing increased capacity in the system (i.e. a tighter re-use of frequency channels) or for accomplishing improved quality in the current communication links (i.e. increased data or voice quality for the final user). There are found a number of documents disclosing different ways for obtaining radiated power narrowly directed toward a station currently receiving communication over a certain time slot in a TDMA system. For instance international applications WO94/11956 and WO96/29838 are disclosing systems adopted to match a base station's radiated field in one direction towards the particular current mobile station communicated during a particular time slot.

In the Japanese PDC system for mobile telephony each mobile station can have two or more antennas. During the last millisecond before reception of an allocated time slot, see FIG. 1, the mobile telephone measures power received in its respective antennas. The antenna showing best performance then will be used during the time slot containing information for the particular mobile. This diversity function provides a complicating factor for a concept using adaptive antennas for the PDC system.

In order to have this antenna selection function in such a system it is required, according to the PDC standard, that the power measured by the mobile station not to be more than 8 dB below maximal power from the base station. If no particular measures are taken, a narrow signal beam used towards a current mobile station results in that a mobile station, which is to be active for reception in the next time slot, runs the risk of having a deteriorated or totally spoiled diversity function due to not detecting enough power at the end of the previous time slot.

In order to generate more narrow beams giving better directivity for the transmitted power an antenna array will normally be used. However, to be able to generate an arbitrary antenna pattern, it is necessary that the different radiating elements in the antenna array being fed with coherent signals, i.e. with small amplitude and phase errors.

A well-known method to reduce the coherency demand is to utilize a so called Butler matrix, which in an efficient manner performs an analog beam shaping However, the beams formed will in part be statically decided by the combination network and in part have a sidelobe level typically lower than −13 dB relative to the main beam. What the Butler matrix essentially does is to direct the main beam to a certain direction. Each beam port of the Butler matrix corresponds to a specific controlled directive angle. By combining a number of these fixed beams the same possibility of arbitrary beam shaping as in a case of not having a Butler matrix exists. However this implies on the other hand that the demands of coherency will be strong.

The demand of equality between signal paths in amplitude will be of the order 1 dB and of the order 20 degrees in phase. This is valid independently of having a system using a Butler matrix or not.

A solution to the general problem should be to form an antenna pattern which enables the mobile station in a current time slot to receive full power simultaneous as the mobile station in the following time slot also receives a signal strong enough for the diversity function to operate.

SUMMARY

The general inventive idea for an adaptive antenna device which solves the present problem is based on an array combination having realized low coherency demands. This may be, for instance, achieved by means of a Butler matrix. However, there should also be a possibility to generate additional sidelobe power which does not show sidelobe levels of typically −13 dB or less relative to the main beam normally obtained, but maintaining a sidelobe in a desired direction at a preferred level of about −8 dB in accordance with the PDC standard for its diversity function to operate properly.

The principle generally implies that fixed beams of a Butler Matrix may be utilized. In the beam having the best performance for the present downlink a signal carrying information will be transmitted. In another beam, which in a corresponding manner has the best performance in regard to the next mobile station to be communicated in a next time slot, a signal will be sent which has a low cross correlation relative to the present signal carrying information.

Utilizing a fact that both signals then are 'essentially orthogonal', the average power in the direction to the next mobile station to be communicated will be given by the sum of the average power of the two signals after amplification by the respective antenna pattern. By the expression 'essentially orthogonal' is indicated that the cross correlation between the signals should be low enough so the sum will be a power addition but not a coherent addition.

This implies that in this case there does not exist any demands on a mutual coherency of the transmitted signals for the main beam and the created intended sidelobe, respectively.

BRIEF DESCRIPTION OF THE DRAWINGS

The objects, features and advantages of the present invention as mentioned above will become apparent from the description of the present invention given in conjunction with the following drawings, wherein.

DETAILED DESCRIPTION

Figure 1:
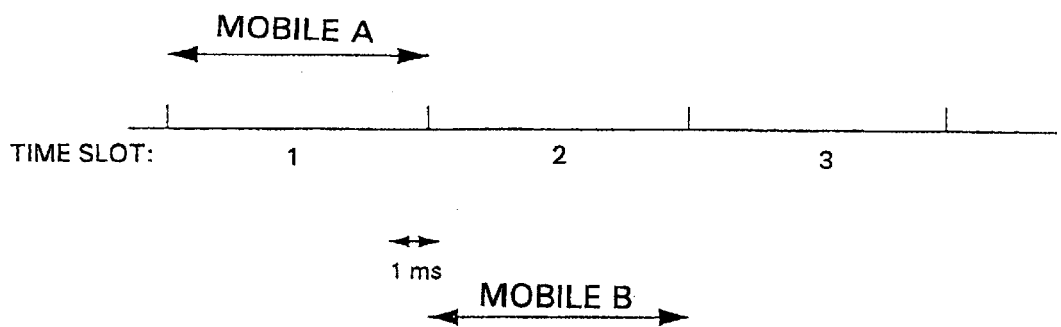
FIG. 1 is a time slot representation, in which a next station MOBILE B to receive information during time slot 2 measures power and selects antenna during the last millisecond of the preceding time slot 1.
Figure 2:
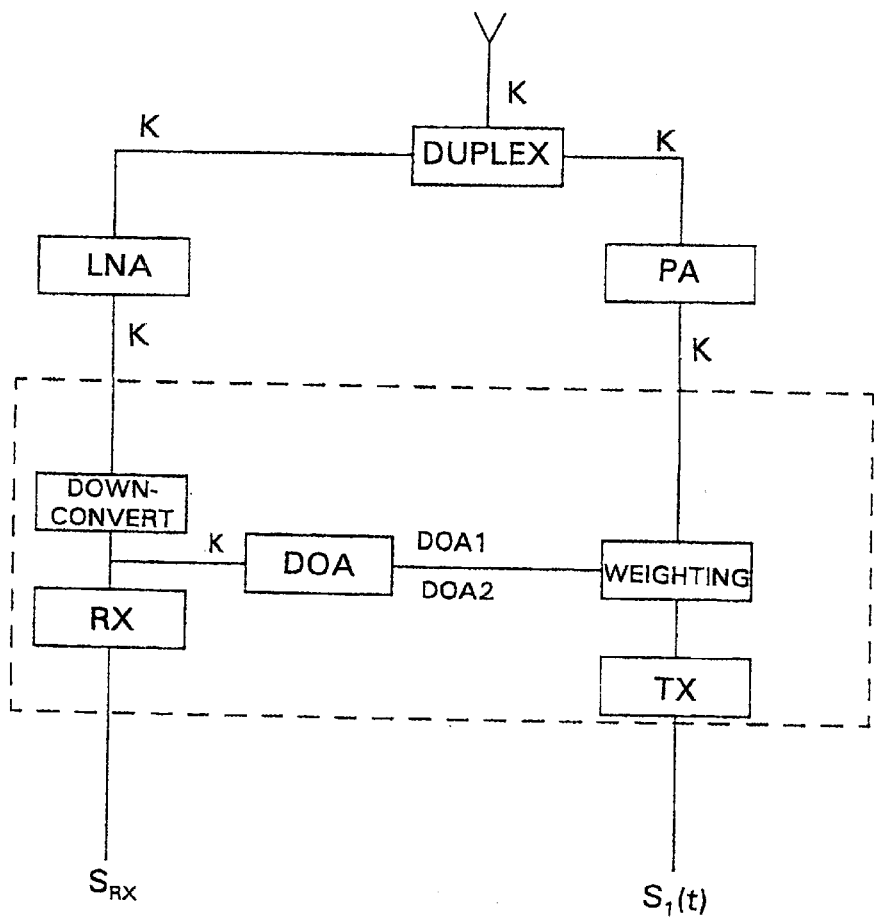
FIG. 2 shows a block diagram of a principal embodiment of a general single carrier coherent system having no Butler Matrix.

A principal prior art system for a single carrier frequency is visualized in the form of a block diagram in FIG. 2. The signal, $S_1(t)$, carrying the information to be transferred, is modulated onto a carrier, which is transmitted by a transmitter TX to a weighting unit. This unit then, from information DOA1, weights the signals to the K beam branches to be transferred further in the arrangement for obtaining a desired direction of transmission. The final beam is obtained by the weighting of the signal by the unit with a suitable phase and amplitude respectively. This weighting is based on direction information obtained from a unit deciding direction of arrival (DOA) for signals from the particular mobile station. Thus, the information of direction to a particular mobile station is estimated at the cellular base station assisted by its reception of the particular mobile station and is set forth and utilized by means of the weighting unit. Another signal DOA2 selects another direction for correspondence to the next time slot to be transmitted for obtaining also a beam for a desired diversity function in a PDC system.

Figure 3:
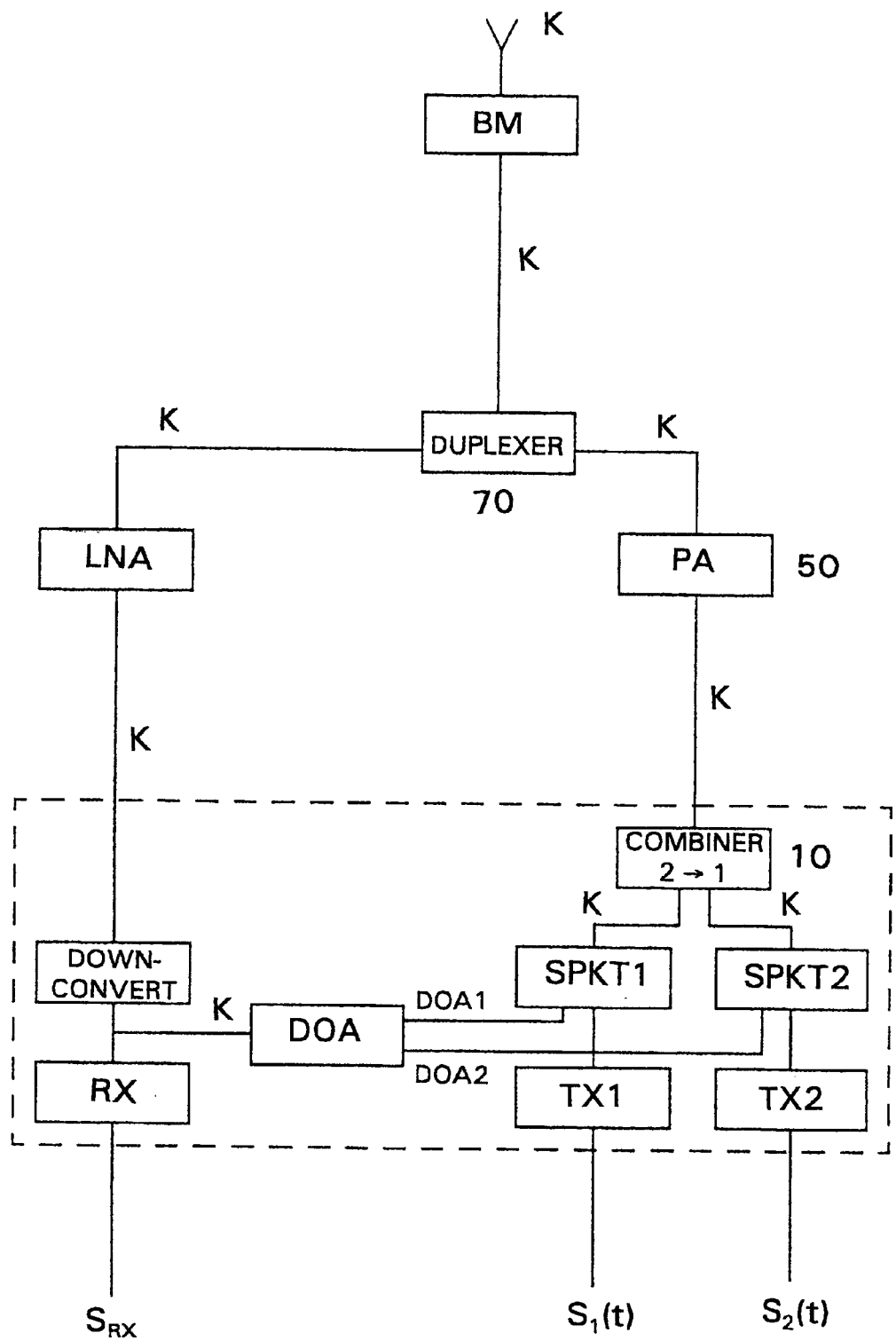
FIG. 3 shows a block diagram of a principal embodiment of a single carrier non-coherent system in accordance with the present invention.

According to the present invention a principal system for a single carrier frequency is visualized in the form of a block diagram in FIG. 3. The signal, $S_1(t)$, carrying the information to be transferred is modulated onto a carrier, which is transmitted by a transmitter TX1 to a switch SPKT1. This switch then from an information DOA1 connects the signal to one of K beam branches to be transferred further in the arrangement for obtaining a desired direction of transmission. Which branch to be selected in the switch is based on direction information obtained from the unit DOA deciding direction of arrival for signal from the particular mobile station. Thus, the information of direction to a particular mobile station is estimated at the cellular base station assisted by its reception of the particular mobile station and is set forth and utilized by means the unit DOA.

Another signal, $S_2(t)$, in principal orthogonal to the first signal, $S_1(3)$, is generated to create an intentional secondary beam and in a similar manner modulating a second transmitter TX2 operating with the same carrier frequency as TX1 and connected via a second switch SPKT2. At SPKT2 a branch of K available beam branches is selected. This branch should best represent the direction to the mobile station intended to use the next time slot, and the selection is, in a similar way as for SPKT1, based on direction information obtained from the DOA unit. The latter signal transmitted by transmitter TX2 is set to a lower level, for a PDC system generally to produce a signal at about −8 dB compared to a signal carrying information for the particular time slot in the TDMA sequence. Thereby an intentional sidelobe will be created at a desired level to cover a second mobile station to receive the next time slot. Each of the switches SPKT1 and SPKT2 outputs a respective set of K beam branches of which typically only one in each set is carrying a signal (desired or "sidelobe").

The two sets of K branches then are combined in a combiner 10 to one set of K branches which are then amplified by amplifiers 50 and fed to the beam ports of the antenna via an ordinary duplexer filter or a circulator 70. The radiator elements of the antenna in turn are conventionally fed via a Butler Matrix (BM). In this principal embodiment the amplifiers 50 utilized may be of a type Single Carrier Power Amplifier (SCPA) but generally Multi Carrier Power Amplifiers (MCPA) will be preferred for using more than one channel frequency (carrier frequency). In another embodiment the amplification may as well be performed after the Butler matrix. In a typical embodiment the amplifiers may even be integrated with the radiating elements connected to the output ports of the Butler Matrix, BM.

Figure 4:
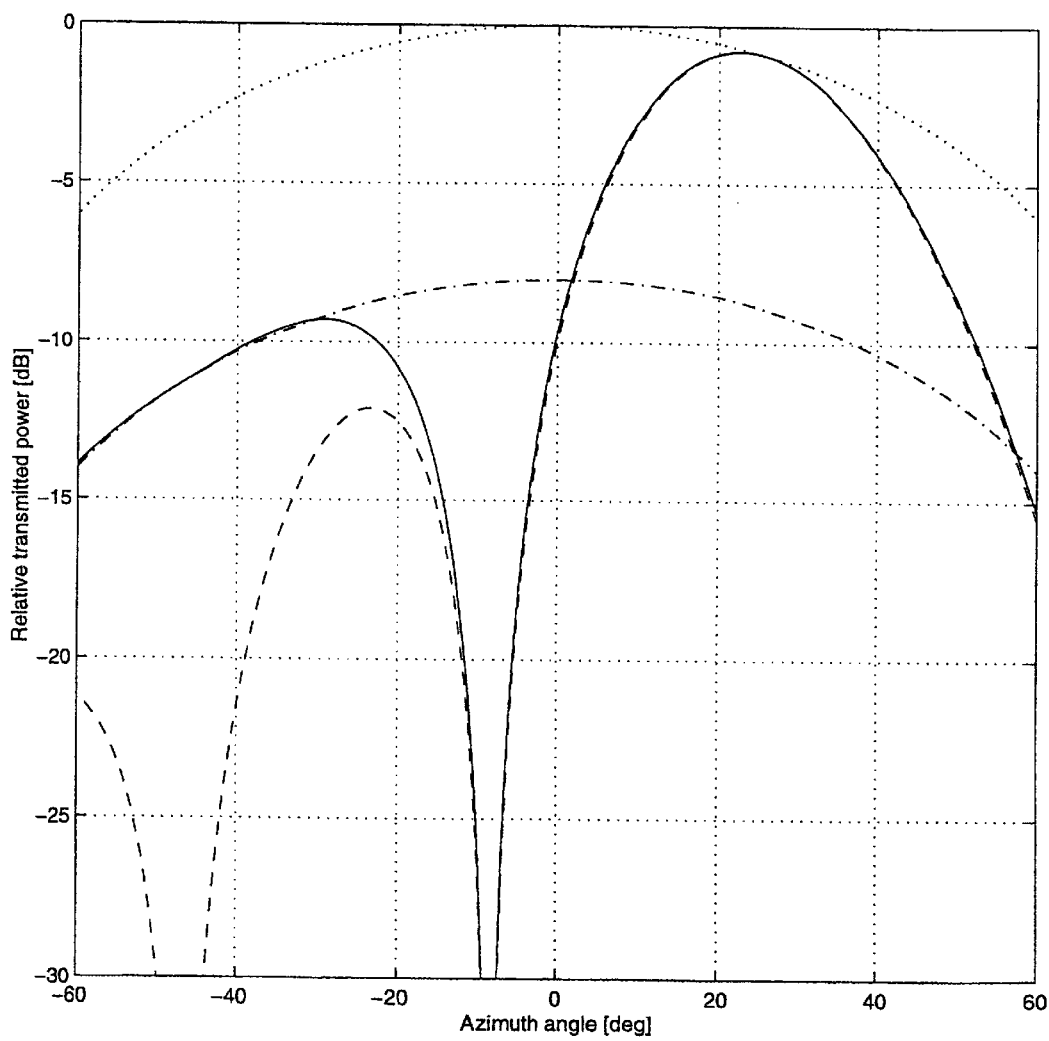
FIG. 4 illustrates an example of beam shaping with a main beam at azimuth angle 25° with in part a normal sidelobe as well as with an intended sidelobe at −8 dB relative to maximum available power at −30° to −60°.

FIG. 4 illustrates an intended sidelobe generation in a fixed beam case. The dotted line [·····] indicates the expected main beam power level output from a Butler Matrix as a function of azimuth angle. The dashed/dotted line [-·-·-] indicates a desired power level −8 dB according to the PDC standard for maintaining a diversity function. The dashed lines [- - - - -] mark a resulting main beam at about +22 degrees of azimuthal radiation and a first sidelobe at about −13 dB at −22 degrees as well as a portion of a further sidelobe normally output by means of the Butler Matrix. The full lines [—] indicates a beam pattern with an intended sidelobe which will obtained by means of an embodiment according to the block diagram of FIG. 3. The created intended sidelobe will be a power addition, but not a coherent addition, of the ordinary sidelobes of the main beam and an added beam having low cross correlation to the main beam.

In other words, expressed mathematically, the average value according to the formula $$m_{12} = \frac{1}{T} \int_{(t-0.5T)}^{(t+0.5T)} S_1(t) \cdot S_2(t)^* dt$$

as will be recognized by a person skilled in the art, should be small compared to a corresponding average value m22(t). $S_1(t)$ denotes the signal carrying information, while $S_2(t)$ denotes a signal being added to facilitate diversity selection. T is the time during which the mobile station measures power with each antenna, i.e. for PDC normally expected to be of the order 0,5 ms.

This intended sidelobe at a level −8dB compared to the main beam, may be achieved during the entire time slot when transmitting information over the main beam, or the added sidelobe is generated only during a last short period of the actual time slot, e.g. during a last millisecond of the particular transmission time slot.

Figure 5A:
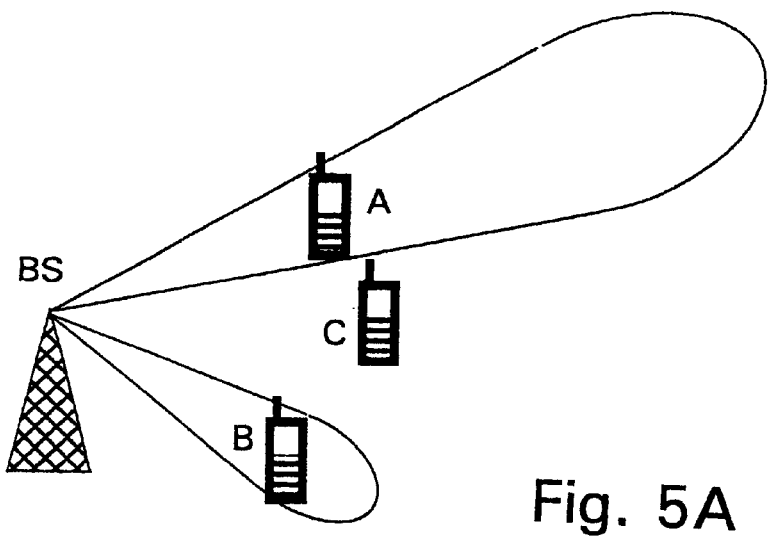
FIGS. 5A, 5B and 5C illustrates a single carrier system utilizing three time slots for communicating three separate mobile stations A, B and C, respectively.
Figure 5B:
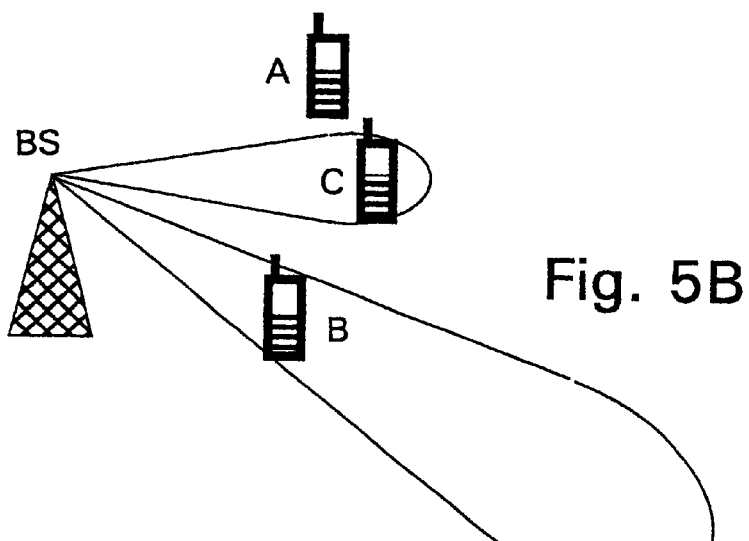
Figure 5C:
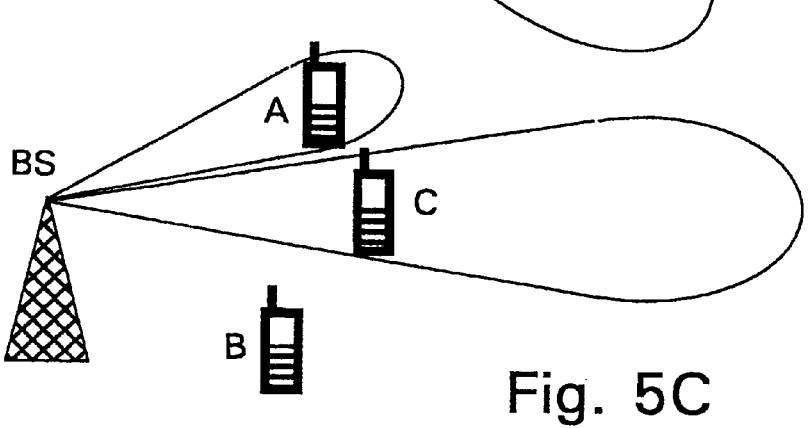

FIGS. 5A–5C illustrates a single carrier (one TDMA shared frequency) mobile communication scheme utilizing three time slots from a base station BS for three mobile stations A, B and C. During a first time slot in FIG. 5A, the mobile A is receiving information, while mobile B receives an intended sidelobe for its diversity function to operate properly. During the second time slot in FIG. 5B mobile B then receives information while mobile C will obtain power from another intended sidelobe for its diversity function. Finally during the third time slot in FIG. 5C mobile C will receive information while mobile A obtains signal power from the intended sidelobe for the diversity function. Then the sequence repeats for another round to the three mobile stations. Instead of transmitting the extra sidelobe during an entire time slot, the extra sidelobe may be generated only during a last short period of the actual time slot, e.g. during a last millisecond of the particular time slot for saving power and minimizing interference in a larger system.

Figure 6:
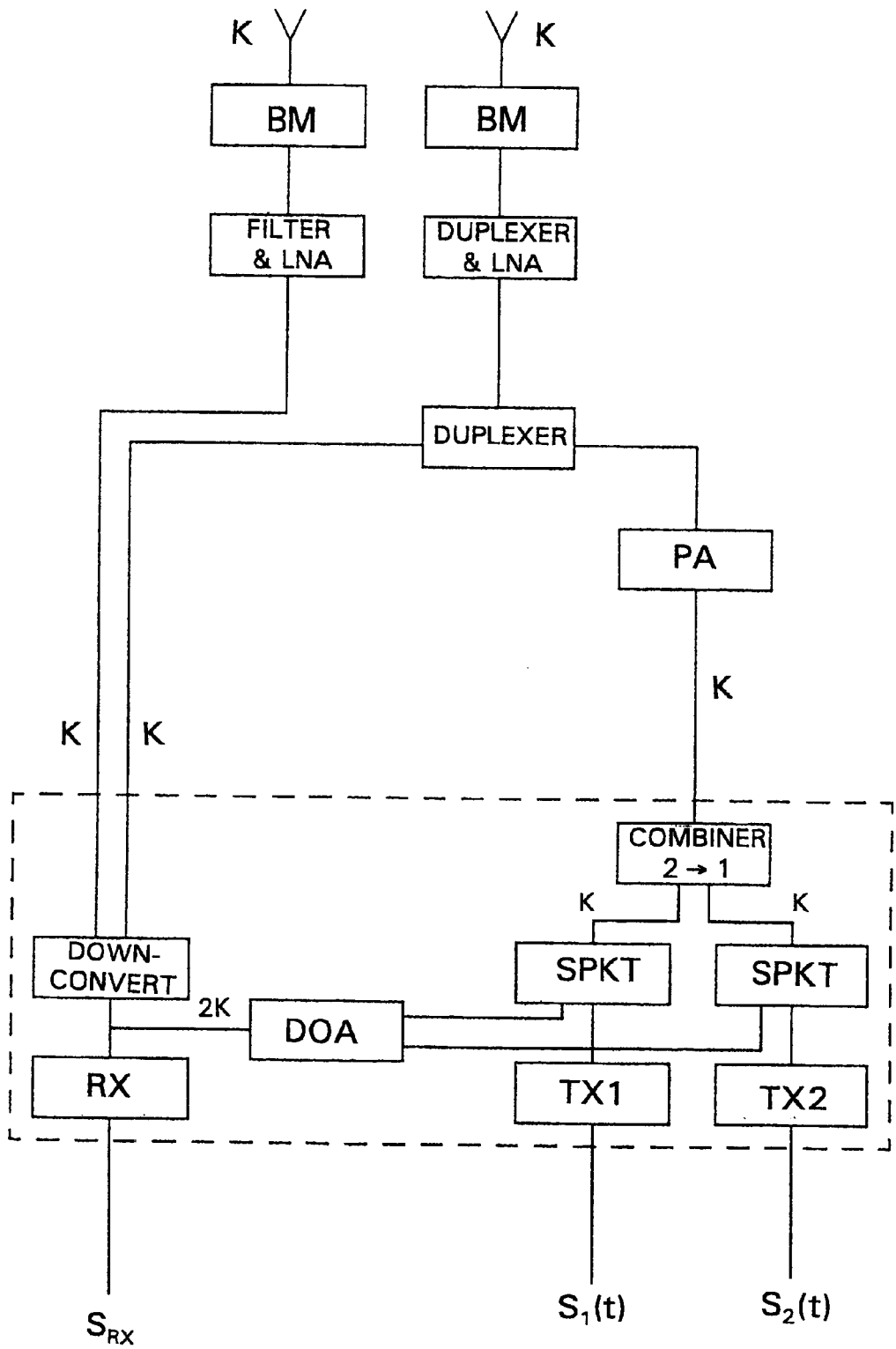
FIG. 6 is a block diagram of another principal embodiment of the present invention showing a non-coherent single carrier system having diversity reception.

FIG. 6 represents a slightly more complex single carrier system in which in analogy to FIG. 3, but FIG. 6 shows utilizing of a double polarized antenna for obtaining further receiver diversity at the base station. In FIG. 6 the DOA unit will have to handle 2K down-converted beam branches. The transmitting portion needs an extra duplexer for handling the reception low noise amplifiers for the transmitting polarization when different from FIG. 3 the low noise amplifiers (LNA) are positioned immediately close to the Butler Matrix. The other receiving polarization uses a separate filtering and LNA unit as will be apparent to a person skilled in the art.

Figure 7:
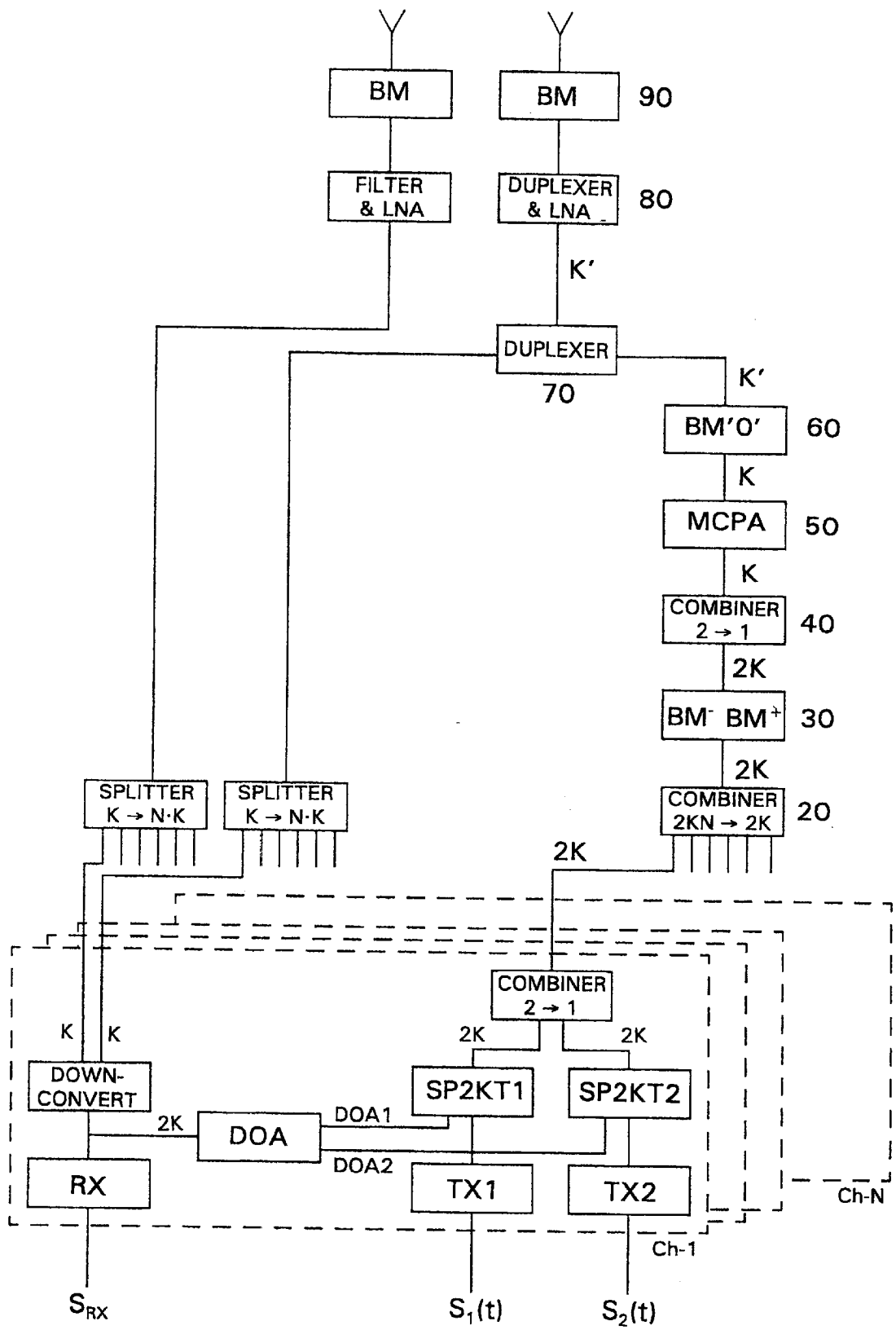
FIG. 7 shows a block diagram of an embodiment representing a non-coherent multi carrier antenna system in accordance with the present invention.

FIG. 7 finally represents an even more complex but more general multi carrier build-up also utilizing a double polarized antenna for obtaining receiver diversity. Besides a fixed polarization utilized for transmission, there are included two different Butler Matrixes (BM− and BM+, respectively), the beams of which are slightly skewing in a way such that the two sets of K beam branches will be interleaved. This interleaving of beams will be further discussed below in connection to FIGS. 8A and 8B.

Again returning to FIG. 7, which in principle is equal to FIG. 3, and in which an extra transmitter module TX2 is used for obtaining an intended added sidelobe slightly higher in power than generally obtained by just utilizing a Butler Matrix and the ordinary TX1 signal, for instance, for utilization of diversity functionality of a PDC system. The left transmitter, TX1, generates the channel signal carrying information, while the right transmitter, TX2, generates a second frequency channel signal having a low cross correlation relative to the first signal carrying information. The TX2 signal is to be used for creating the added sidelobe ensuring an operating diversity function in a PDC system.

There are many ways of creating signals of low cross correlation, for example orthogonal signals, some of which of course are not suitable for use in this case. However, as the second signal in this case is not to be intelligibly decoded, but used only in obtaining a measurable field strength at the mobile station having the next time slot, a suitable method would be to transmit, as the second signal, a time shifted copy of the signal carrying information or alternatively a signal based on an entirely arbitrary bit stream.

In line with FIG. 3, there is found in FIG. 7 after TX1 and TX2 a respective switch SP2KT1 and SP2KT2 getting direction information from a DOA unit. The two switches SP2KT1 and SP2KT2 produces each a set of K+K branches representing a set of 2K interleaved beams applied to the 2-to-1 combiner, which combines the two sets of K+K branches into one set of K+K branches for a first carrier frequency. Equally there is for each one of the N carrier frequencies (channels) created one such set of K+K branches. All the N sets of K+K branches are then combined by a second combiner 20 for N-to-1 into one set of K+K branches containing all the N carrier channel frequencies present. These K+K branches are then applied to a next Butler Matrix device 30 containing the two combined Butler Matrixes (BM− and BM+, respectively, the sign indicating a shifting of the beam to left or the right of a default direction) creating the set of K+K branches of interleaving beams. The set of K+K branches of interleaving 2K beams are again combined in a 2-to-1 combiner, 40, into a set of K branches. This being equal to transforming power into what we could call "element space" from the previous state which we would call "beam space". The difference will be that in element space the power for each single carrier will be equally distributed between all K branches, while in beam space the power for each carrier will be expected to be found mainly in one of the branches corresponding to a particular direction.

The K branches resulting from the combiner 40 then suitably are amplified by Multi Carrier Power Amplifiers 50 (MCPA). The amplified K branches subsequently being applied to still another Butler Matrix 60 and then again being transformed back to K' branches in "beam space". However, to be more explicit, it may better be referred to as "almost beam space" as there will be included an offset due to the interleaving introduced by the Butler Matrixes BM− and BM+ and the branches rather being denoted K−+K+instead of just K+K before the 2-to-1 combiner 40 which produces the K branches. This is the reason for the particular prim notation after the Butler Matrix 60, BM'0'.

Similar to FIG. 3 the K' branches then are applied to a circulator or duplexer 70. From the duplexer 70 then to a second duplexer which will be found close to the antenna array dividing the antenna into a receiver channel path having the low noise amplifiers (LNA) for this particular receive/transmit polarization and a transmit path to the final Butler Matrix 90 corresponding to the Butler Matrix of FIG. 3. In FIG. 7 there is to the left a further receive channel of the other polarization in the case of a double polarized system, but it may also represent just another antenna in a space diversity system. However this is not part of the present invention and therefore not being further described.

Figure 8A:
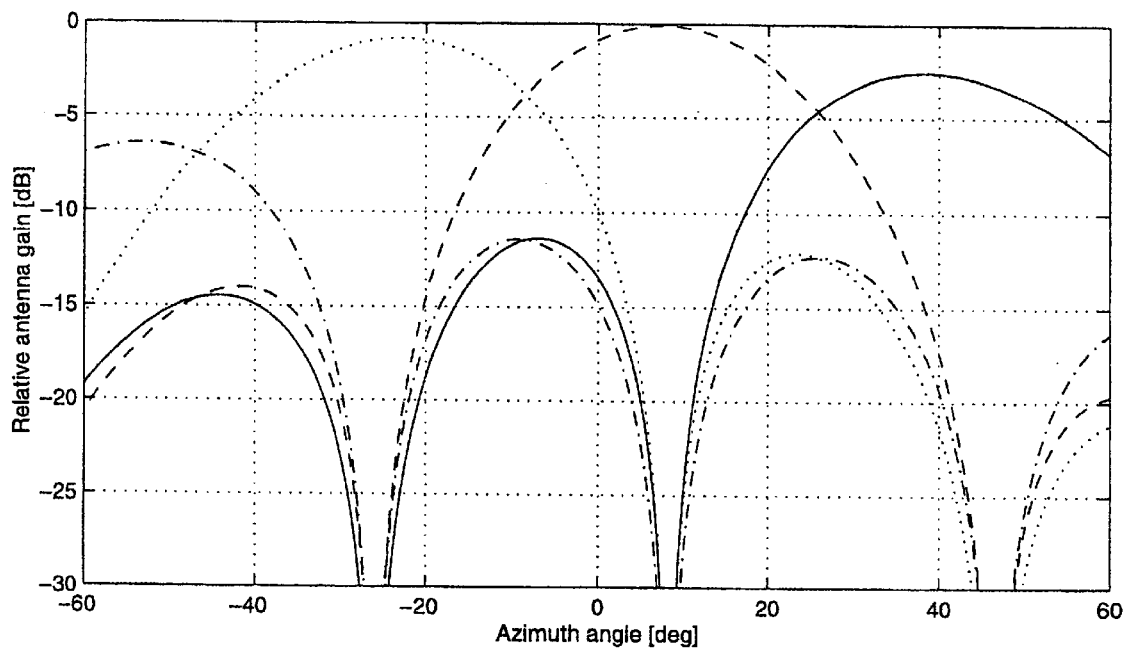
FIGS. 8A and 8B shows a calculated antenna array radiation pattern for 4+4 beams when utilizing interleaving of beams.
Figure 8B:
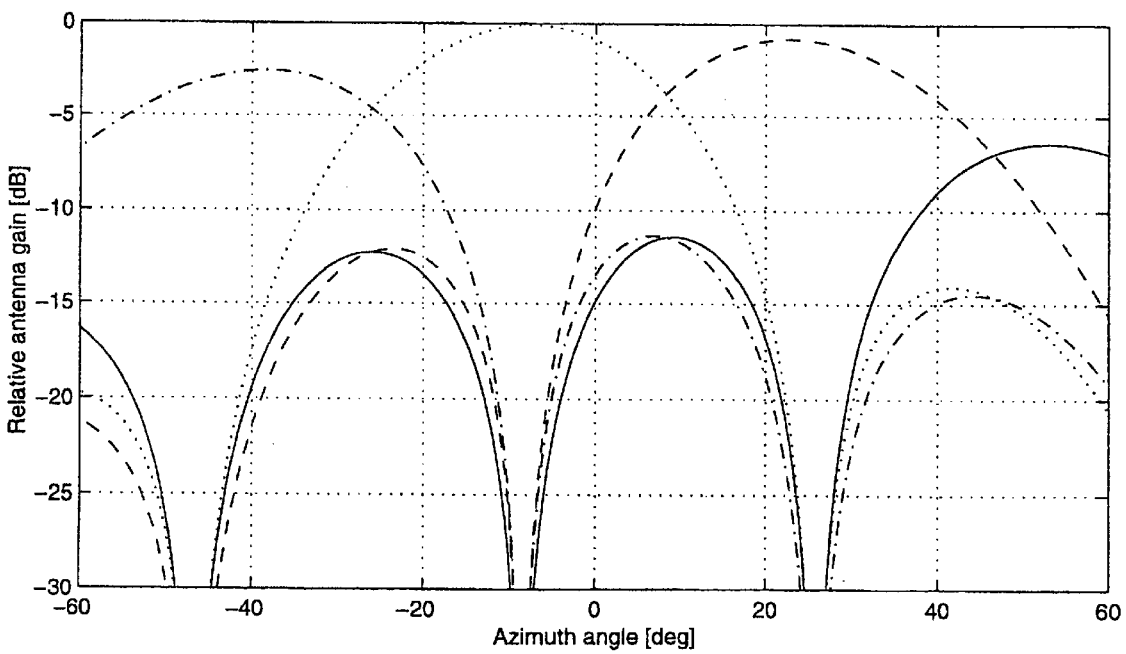

FIGS. 8A and 8B demonstrate examples of horizontal radiation patterns resulting for an antenna array having 4 vertical columns, each column connected to a Butler Matrix output port. FIG. 8A theoretically (in a generalized definition of the antenna elements) corresponds to beam signals created by BM− of FIG. 7, while FIG. 8B corresponds to beam signals created by BM+ of FIG. 7. A different type of line each represents a beam port, the full line [—] representing beams of port 1, the dashed line [- - - - -] representing beams of port 2, the dotted line [·····] representing beams of port 3 and finally the dashed/dotted line [-·-·-] representing beams of port 4. As is easily seen the beams are here shifted to the left in FIG. 8A while they are shifted to the right in FIG. 8B. It will be evident for a person skilled in the art that combining the patterns of FIGS. 8A and 8B will result in more beams. This then applied to FIG. 4 will according to the embodiment of FIG. 7 further improve the desired intentional beam function according to the present invention as the signal $S_2(t)$ will be affected in the same manner as the signal $S_1(t)$ and consequently the pointing error will be less.

The invention has been described functionally in detail with reference to drawings relating to embodiments. The more detailed realization can be achieved by a technique, which is well known to a person skilled in the art of adaptive antenna arrays. The possibility of an arbitrary combination of different embodiments in order to produce an efficient and appropriate device is also intended to lie within the scope of the invention.

What is claimed is:

1. An apparatus for intentional sidelobe creation utilized in a TDMA system transmitting signals for obtaining a diversity function used in a cellular mobile telephone system, comprising:
   a first transmitter transmitting a first signal carrying information for a current mobile station using a current times slot, said signal carrying information being transmitted by an antenna beam covering the position of current mobile station;
   a second transmitter transmitting a second signal for obtaining signal power for a second mobile station to receive information in a next time slot, said second transmitted signal having low cross correlation relative to said first transmitted signal and transmitted at a lower power level and intended, together with said first signal, to create a substantial detectable power level in a direction towards, the second mobile station for its diversity function to operate in preparing for the reception of information in the next time slot;
   a first switch fed by said first transmitter, for connecting the first signal to one branch out of a first path of K branches, the selected one branch being the one having a main beam in the direction towards the first mobile station;
   a second switch fed by said second transmitter at a reduced power level, for connecting the second signal to one out of a second path of K branches for obtaining an intentional sidelobe in the direction to the second mobile station; and
   a first path of combiner combining the first K branches and second path of K branches to output a third path of K branches to be fed to a Butler matrix, said Butler matrix feeding corresponding antenna elements creating a main beam towards the current mobile station receiving the current time slot and an intentional sidelobe covering the second mobile station to receive the following time slot, the cross correlation being low between the first signal producing the main beam and the second signal for the intentional sidelobe creation.

2. The apparatus according to claim 1, wherein said first and second switches select a respective branch of available K beam branches by means of direction information obtained from a unit presenting direction information toward the mobile stations to receive information during the actual time slot and the next time slot, thereby controlling the switching of the first and second switches.

3. The apparatus according to claim 2, wherein 2K branches from the respective, switches produce a set of $W^-+K^+$ branches, thereby presenting a set of 2K interleaved beams applied to the first combiner.

4. The apparatus according to claim 3, comprising a second combiner combining a same number of branches of N first combiners, each combiner representing one TDMA carrier frequency, into a corresponding number of branches which further via additional devices will feed the radiating elements.

5. The apparatus according to claim 4, wherein the combined branches from said second combiner are amplified after said Butler matrix before being distributed to the antenna radiating elements.

6. The apparatus according to claim 1, wherein the second signal generated by said second transmitter represents a time shifted copy of the signal carrying information, said second signal having a low cross correlation to the signal carrying information.

7. The apparatus according to claim 1, wherein the second signal generated by said second transmitter is a signal based on an arbitrary bit stream, said second signal having a low cross correlation to the signal carrying information.

8. The apparatus according to claim 1, wherein the combined branches from said first combiner are amplified by power amplifiers before being distributed to said Butler matrix.

9. The apparatus according to claim 1, wherein the intentional sidelobe, covering the second mobile station to receive the following time slot, produces a sidelobe level of the order −8 dB in relation to an expected nominal beam power when the main beam is directed towards the second mobile station.

10. The apparatus according to claim 9, wherein the intentional sidelobe directed to a second mobile station to receive next time slot is created during a full period of the current time slot.

11. The apparatus according to claim 9, wherein the intentional sidelobe directed to a second mobile station to receive next time slot is created only during a last portion of the period of the current time slot to save power and minimize interference.

12. A system for intentional sidelobe creation utilized with TDMA for obtaining a diversity function in a cellular mobile telephone system comprising a receiving portion the system and a transmitting portion, comprising:
   a first transmitter transmitting a first signal carrying information for a current mobile station using a current times slot, said signal carrying information being transmitted by an antenna beam covering the position of current mobile station;
   a second transmitter transmitting a second signal for obtaining signal power for a second mobile station to receive information in a next time slot, said second transmitted signal having low cross correlation relative to said first transmitted signal and transmitted at a lower power level and intended to together with said first signal to create a substantial detectable power level in a direction towards the second mobile station for its diversity function to operate in preparing for the reception of information in the next time slot;
   a first switch fed by said first transmitter connecting said first signal to one branch out of a first path of K branches, the selected one branch being the one having a main beam in the direction towards the first mobile station;
   a second switch fed by the second transmitter at a reduced power level, connects said second signal to one out of a second path of K branches for obtaining an intentional sidelobe in the direction to the second mobile station; and
   a first path of combiner combining said first K branches and second path of K branches to output a third path of K branches to be fed to a Butler matrix, said Butler matrix having corresponding antenna elements creating a main beam towards the current mobile station receiving the current time slot and an intentional sidelobe covering the second mobile station to receive the following time slot, the cross correlation being low between the first signal producing the main beam and the second signal for the intentional sidelobe creation.

13. The system according to claim 12, wherein the first and second switches select a respective branch of available K beam branches by means of direction information obtained from a unit presenting direction information toward the mobile stations to receive information during the actual time slot and the next time slot, thereby controlling the switching of the first and second switches.

14. The system according to claim 13, wherein 2K branches from the respective switches produce a set of $K^-+K^+$ branches, thereby presenting a set of 2K interleaved beams applied to said first combiner.

15. The system according to claim 14, further comprising a second combiner combining a same number of branches of N first combiners, each combiner representing one TDMA carrier frequency, into a corresponding number of branches which further via additional devices will feed the radiating elements.

16. The system according to claim 12, wherein the second signal generated by said second transmitter represents a time shifted copy of the signal carrying information, said second signal having a low cross correlation to the signal carrying information.

17. The system according to claim 12, wherein the second signal generated by said second transmitter is a signal based on an arbitrary bit stream, said second signal having a low cross correlation to the signal carrying information.

18. The system according to claim 12, wherein the combined branches from said first combiner are amplified by power amplifiers before being distributed to said Butler matrix.

19. The system according to claim 15, wherein the combined branches from the second combiner are amplified after said Butler matrix by, before being distributed to the antenna radiating elements.

20. The system according to claim 12, wherein the intentional sidelobe, covering the second mobile station to receive the following time slot, produces a sidelobe level of the order −8 dB in relation to an expected nominal beam power when the main beam is directed towards the second mobile station.

21. The system according to claim 20, wherein the intentional sidelobe directed to a second mobile station to receive next time slot is created during a full period of the current time slot.

22. The system according to claim 20, wherein the intentional sidelobe directed to a second mobile station to receive next time slot is created only during a last portion of the period of the current time slot to save power and minimize interference.

* * * * *